United States Patent
Kang et al.

(10) Patent No.: US 8,891,654 B2
(45) Date of Patent: Nov. 18, 2014

(54) METHOD FOR TRANSMITTING A SIGNAL IN A DISTRIBUTED ANTENNA SYSTEM

(75) Inventors: Ji Won Kang, Anyang-si (KR); Wook Bong Lee, Anyang-si (KR); Bin Chul Ihm, Anyang-si (KR); Jin Young Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 243 days.

(21) Appl. No.: 13/516,685

(22) PCT Filed: Dec. 7, 2010

(86) PCT No.: PCT/KR2010/008693
§ 371 (c)(1),
(2), (4) Date: Aug. 24, 2012

(87) PCT Pub. No.: WO2011/074818
PCT Pub. Date: Jun. 23, 2011

(65) Prior Publication Data
US 2012/0314806 A1     Dec. 13, 2012

Related U.S. Application Data

(60) Provisional application No. 61/287,688, filed on Dec. 17, 2009.

(30) Foreign Application Priority Data

Feb. 22, 2010    (KR) ........................ 10-2010-0015600

(51) Int. Cl.
*H04B 7/06* (2006.01)
*H04W 72/04* (2009.01)
*H04B 7/04* (2006.01)
*H04B 7/02* (2006.01)

(52) U.S. Cl.
CPC ............ *H04B 7/0417* (2013.01); *H04B 7/0456* (2013.01); *H04B 7/0478* (2013.01); *H04W 72/0406* (2013.01)
USPC ........... 375/267; 375/260; 375/259; 370/335; 370/310; 370/328; 370/329; 455/452.1; 455/451; 455/450; 455/422.1; 455/403; 455/509; 455/500; 455/39; 455/522; 455/517; 455/507; 455/446; 455/562.1; 455/561; 455/73

(58) Field of Classification Search
CPC .... H04B 7/024; H04B 7/0417; H04B 7/0452; H04B 7/0639; H04B 7/0456; H04B 7/0482; H04B 7/0691; H04B 7/0426; H04B 7/04; H04B 7/0608; H04B 7/0634; H04B 7/0665; H04L 5/0035; H04L 5/0057; H04L 5/0073; H04W 72/0406; H04W 72/042; H04W 52/30; H04W 52/346; H04W 52/241; H01Q 1/246
USPC ........... 455/452.1, 451, 450, 422.1, 403, 509, 455/500, 39, 522, 517, 507, 446, 562.1, 455/561, 73; 370/329, 328, 310, 335; 375/267, 260, 259
See application file for complete search history.

(56) References Cited

U.S. PATENT DOCUMENTS

2009/0046801 A1*   2/2009   Pan et al. .................. 375/267
2010/0069122 A1*   3/2010   Ito ............................ 455/562.1

OTHER PUBLICATIONS

Xiaoming Chen; Zhaoyang Zhang; Peiya Wang, "Codebook Design and Power Allocation for Distributed Space Time Codes," Vehicular Technology Conference Fall (VTC 2009-Fall), 2009 IEEE 70th, vol., No., pp. 1,5, Sep. 20-23, 2009.*

(Continued)

*Primary Examiner* — Eva Puente
*Assistant Examiner* — Michelle M Koeth
(74) *Attorney, Agent, or Firm* — Lee, Hong, Degerman, Kang & Waimey

(57) ABSTRACT

The present invention relates to a method for configuring, for each of one or more ranks in the DAS (distributed antenna system), a codebook for a DAS, including pre-coding matrices for the DAS, wherein the matrices include information on at least one or more antennas used for communication with a specific terminal, from among the whole antenna of the base station which belongs to the DAS, and information on the ratio of electric power allocated to each of the antennas of the base station. The present invention also relates to a method for transmitting a signal which is pre-coded using the thus-configured pre-coding matrices for the DAS.

9 Claims, 5 Drawing Sheets

(56) References Cited

OTHER PUBLICATIONS

Wan Choi et al., "Downlink Performance and Capacity of Distributed Antenna Systems in a Multicell Environment", IEEE Transactions on Wireless Communications, vol. 6, No. 1, Jan. 2007.

Michael Grieger et al., "On the Performance of Compressed Interference Forwarding for Uplink Base Station Co-operation", IEEE Global Telecommunications Conference, Dec. 2009.

Ryosuke Osawa et al., "Performance of Two-Way Channel Estimation Technique for Multi-User Distributed Antenna Systems with Spatial Precoding", IEEE 70th Vehicular Technology Conference, Sep. 2009.

* cited by examiner

METHOD FOR TRANSMITTING A SIGNAL IN A DISTRIBUTED ANTENNA SYSTEM

CROSS-REFERENCE TO RELATED APPLICATIONS

This application is the National Stage filing under 35 U.S.C. 371 of International Application No. PCT/KR2010/008693, filed on Dec. 7, 2010, which claims the benefit of earlier filing date and right of priority to Korean Application No. 10-2010-0015600, filed on Feb. 22, 2010, and also claims the benefit of U.S. Provisional Application Ser. No. 61/287,688, filed on Dec. 17, 2009, the contents of which are all incorporated by reference herein in their entirety.

FIELD OF THE INVENTION

The present invention relates to a Distributed Antenna System and, more particularly, to a method for transmitting a signal in a Distributed Antenna System.

BACKGROUND ART

With the evolution in the information industry, a technology performing high speed transmission of diverse types of high capacity data is being required. In order to do so, by providing multiple distributed antennas within the conventional (or already-existing) cell, a Distributed Antenna System (DAS) method for resolving shadow areas and expanding coverage ranges is currently being developed.

The DAS corresponds to a system using multiple distributed antennas being connected to a single base station via wired connection or a through a dedicated line. Herein, the single base station manages multiple antennas being located in a cell, which is serviced by the base station, wherein each antenna is spaced apart from one another at a pre-determined distance. The DAS is differentiated from a centralized antenna system (CAS) in that multiple antennas are distributed at predetermined intervals within a single cell. Additionally, the DAS is differentiated from a Femto cell in that a central base station of the cell (or a base station located at the center of the cell) controls all of the distributed antenna areas within the cell, instead of having each of the distributed antenna unit autonomously control each area of the corresponding antenna. Moreover, the DAS is differentiated from a multiple hop relay system or ad-hoc network, wherein the base station is connected to a Remote Station (RS) via wireless connection, in that the distributed antenna units are connected to one another via wired connection or through a dedicated line. Furthermore, the DAS is also differentiated from a repeater structure, which simply amplifies a signal and transmits the amplified signal, in that each of the distributed antennas transmits a different signal to each of the neighboring user equipments based upon the command of the base station.

The above-described DAS may be considered as a type of multiple input multiple output (MIMO) system in that the DAS may support a single mobile station or multiple mobile stations by having each of the distributed antennas simultaneously transmit and receive different data streams. In light of the MIMO system, being configured of antennas distributed to diverse locations within the corresponding cell, the transmission area for each antenna is reduced, as compared to the CAS. Thus, the DAS may reduce transmission power. Additionally, by reducing the transmission distance between the antenna and the user equipment, path loss may be reduced, thereby enabling high speed data transmission to be performed. Accordingly, the transmission capacity and power efficiency of a cellular system may be enhanced, and communication performance of a quality that is relatively consistent as compared to the CAS may be yielded. Furthermore, by having the base station connected to each of the multiple distributed antennas via wired connection or through a dedicated line, signal loss may be reduced, and a level of correlation and interference between each of the antennas may also be reduced, thereby providing a high signal to interference plus noise ratio (SINR).

As described above, in order to reduce the cost for installing additional base stations and to reduce the cost for maintaining a Backhaul network, and in order to expand service coverage and to enhance channel capacity and SINR, the next generation mobile communication system may be alternately configured of the conventional CAS and the DAS, or the DAS may replace the conventional CAS so as to become a new basis of cellular communication.

Accordingly, in the related art mobile communication system, a CAS-based communication standard is required to support the CAS as well as the DAS.

DETAILED DESCRIPTION OF THE INVENTION

Technical Objects

Hereinafter, based upon the above-described discussion, a method for configuring a code for the DAS, which may be used in a distributed antenna system (DAS), by using the related art codebook will be proposed.

Additionally, the present invention proposes a method of having the base station select an optimal precoding matrix from a codebook (for the DAS), based upon a wireless environment when communicating with a specific user equipment, and transmit a signal by using the selected precoding matrix.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the above-described technical objects of the present invention, according to an aspect of the present invention, a method for transmitting, by a base station, a signal to a user equipment in a distributed antenna system (DAS), comprises: transmitting, by the base station including a plurality of antennas each being spaced apart from one another at a predetermined distance or more, control information to the user equipment, wherein the control information includes at least one of antenna selection information on a specific number of antennas used for a communication between the base station and the user equipment, among the plurality of antennas, and power ratio information on a ratio of the power being assigned to each of the specific number of antennas; selecting a precoding matrix corresponding to at least one of the antenna selection information and the power ratio information from a codebook for the DAS; and transmitting a signal to the user equipment by using the selected precoding matrix.

At this point, the codebook for the DAS may include an antenna selection matrix corresponding to the antenna selection information and a power control matrix corresponding to the power ratio information.

The precoding matrix may configured of a multiplication between a precoding matrix (W) for a centralized antenna system (CAS) and a specific matrix (P), and the precoding matrix (W) for the CAS may include a matrix corresponding to the power ratio information according to which power is assigned to the plurality of antennas at a constant ratio. And, the specific matrix (P) may be specified by at least one of the antenna selection information and the power ratio information.

Preferably, the control information may be semi-statically decided, and the control information may be transmitted through a dedicated control channel.

In order to achieve the above-described technical objects of the present invention, according to an aspect of the present invention, a method of receiving, by a user equipment, a signal from a base station in a distributed antenna system (DAS), comprises: receiving control information from a base station which includes a plurality of antennas each being spaced apart from one another at a predetermined distance or more, wherein the control information includes at least one of antenna selection information on a specific number of antennas used for a communication between the base station and the user equipment, among the plurality of antennas, and power ratio information on a ratio of the power being assigned to each of the specific number of antennas; receiving a signal from the base station; and processing the signal by using a precoding matrix, the precoding matrix being selected based on at least one of the antenna selection information and the power ratio information from a codebook for the DAS, wherein the codebook for the DAS includes an antenna selection matrix corresponding to the antenna selection information and a power control matrix corresponding to the power ratio information.

In order to achieve the above-described technical objects of the present invention, according to an aspect of the present invention, a base station of a distributed antenna system (DAS), the base station comprises: a plurality of antennas each being spaced apart from one another at a predetermined distance or more; a memory configured to store a codebook for the DAS; a processor configured to generate control information, wherein the control information includes at least one of antenna selection information on a specific number of antennas used for a communication between the base station and the user equipment, among the plurality of antennas, and power ratio information on a ratio of the power being assigned to each of the specific number of antennas, to select a precoding matrix corresponding to at least one of the antenna selection information and the power ratio information from a codebook for the DAS, and to perform precoding on a signal being transmitted to a user equipment belonging to the DAS; and a transmission module configured to transmit the control information and the signal to the user equipment, wherein the codebook for the DAS includes an antenna selection matrix corresponding to the antenna selection information and a power control matrix corresponding to the power ratio information.

In order to achieve the above-described technical objects of the present invention, according to another aspect of the present invention, a user equipment of a distributed antenna system (DAS), the user equipment comprises: a reception module configured to receive control information and a signal from a base station which includes plurality of antennas each being spaced apart from one another at a predetermined distance or more, wherein the control information includes at least one of antenna selection information respective to a specific number of antennas being used for a communication between the base station and the user equipment, among the plurality of antennas, and power ratio information respective to a ratio of the power being assigned to each of the specific number of antennas; a memory configured to store a codebook for the DAS; a processor configured to select a precoding matrix corresponding to at least one of the antenna selection information and the power ratio information from the codebook for the DAS, and to process the signal by using the selected precoding matrix, wherein the codebook for the DAS includes an antenna selection matrix corresponding to the antenna selection information and a power control matrix corresponding to the power ratio information.

The above-described embodiments of the present invention are merely a portion of the preferred embodiments of the present invention. And, it is to be understood by anyone skilled in that art that both the foregoing general description and the following detailed description of the present invention are exemplary and explanatory and are intended to provide further explanation of the invention as claimed.

Effects of the Invention

According to the embodiments of the present invention, a codebook for a DAS, which may be diversely operated based upon the corresponding signaling, may be configured by using the related art codebook, and a signal may be transmitted and received by using the configured codebook for the DAS.

Additionally, according to the embodiments of the present invention, by sharing information on a specific number of antennas, which are used by the base station for communicating with a specific user equipment in the DAS, and information on a power assignment ratio for each antenna with the user equipment, an optimal pre-coding matrix may be selected and used for receiving and transmitting a signal.

Furthermore, according to the embodiments of the present invention, by controlling a power ratio being assigned for a specific number of antennas being used for a communication between the base station and an arbitrary user equipment, an interference effect influencing other user equipments may be reduced.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BEST MODE FOR CARRYING OUT THE PRESENT INVENTION

Figure 1:
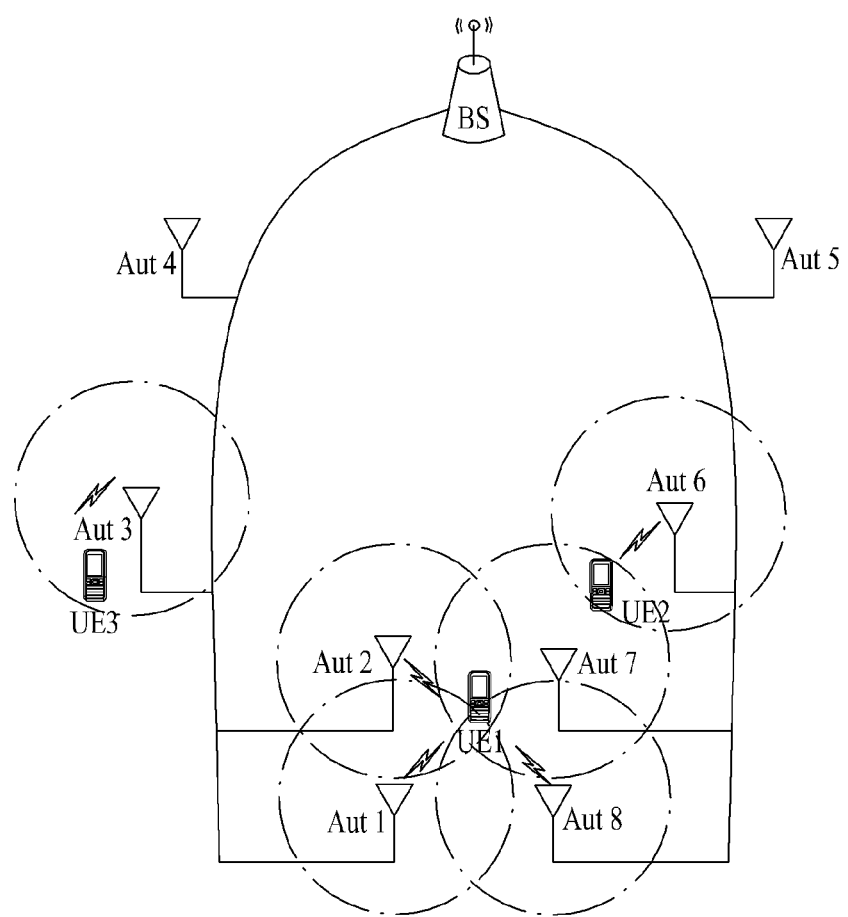
FIG. 1 illustrates an exemplary distributed antenna system adopting the present invention.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide a full and complete understanding of the present invention. However, it will be apparent to those skilled in the art that the present invention can be realized even without the detailed features described herein. For example, the present invention will be described in detail as follows based upon an assumption that the mobile communication system used in the present invention corresponds to a 3GPP LTE system. However, with the exception for the unique features of the 3GPP LTE system, other mobile communication systems may also be randomly applied in the present invention.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Furthermore, in the following description of the present invention, it will be assumed that the term user equipment is used to collectively refer to a mobile or fixed user-end device, such as a UE (User Equipment), an MS (Mobile Station), and so on. Additionally, it will also be assumed that the term base station is used to collectively refer to a random node of a network end communicating with the user equipment, such as Node B, eNode B, Base Station, and so on.

A DAS, which is configured of multiple antennas being connected to a single base station located in a cell via wired connection and being distributed to diverse positions within the cell, may be diversely implemented in accordance with the number of antennas and their respective positions. For example, the multiple antennas may be distributed throughout the cell at predetermined intervals or at least two or more antennas may be concentrated in one specific location. In the DAS, regardless of the format according to which the distributed antennas are positioned within the cell, when the coverage of each antenna overlap one another, signal transmission of rank 2 or higher may be performed. A rank indicates the number of data streams that may be transmitted through at least one or more antenna during a single transmission session.

FIG. 1 illustrates an exemplary distributed antenna system adopting the present invention.

As shown in FIG. 1, one cell may be configured of a single base station being connected to a total of 8 antennas via wired connection. And, herein, each antenna may be spaced apart from one another at a predetermined distance or more at constant or varied intervals within the cell. In the DAS, not all of the antennas connected to the base station are required to be used. Instead, an adequate number of antennas may be used based upon a signal transmission range of each antenna, an overlapping degree of the coverage between two or more neighboring antennas and interference effect between the neighboring antennas, and a distance between the antenna and a user equipment (user). For example, as shown in FIG. 1, when 3 UEs are positioned within a cell, and when UE 1 is positioned within a signal transmission range of antennas 1, 2, 7, 8, UE 1 may receive a signal from antennas 1, 2, 7, 8. On the other hand, with respect to the position of UE 1, a path loss may occur in antennas 3, 4, 5, 6 due to a relatively long distance between the user equipment and each of the corresponding antennas, and the level of power consumption may also increase. And, the signal being transmitted from antennas 3, 4, 5, 6 may be assigned with a value small enough to be disregarded. In another example, when UE 2 is located in a position where the signal transmission range of antennas 6, 7 overlap one another, signals being transmitted from antennas other than antennas 6, 7 may be small or weak enough to be ignored. And, UE 3 may be located in a position within a neighboring range of antenna 3, thereby being capable of solely receiving the signal being transmitted through antenna 3.

As shown in FIG. 1, when the distance between the multiple antennas within a cell of a DAS is excessively apart from one another, the DAS may operate as a MIMO system. The base station may communicate with UE 1 through antenna group 1, which is configured of antennas 1, 2, 7, 8, the base station may, communicate with UE 2 through antenna group 2, which is configured of antennas 6, 7, and the base station may communication with UE 3 through antenna 3. At this point, antennas 4, 5 may perform transmission for each of UE 3 and UE 2 or may be operated in a power off state.

More specifically, when performing a single user/multiple user (SU/MU)-MIMO communication, the DAS system may transmit diverse numbers of data streams to each user equipment, and diverse antennas or antenna groups may be assigned to each user equipment positioned within a cell being serviced by the base station. Depending upon the position of the user equipment existing in the cell, an antenna or antenna group communicating with the corresponding user equipment may be specified. However, depending upon the movement of the user equipment within the cell, the antenna or antenna group may be adaptively varied.

Accordingly, instead of using all of the antennas being connected to the base station via wired connection in order to perform communication with a specific user equipment, as shown in FIG. 1, since some of the antennas or antenna groups are used in the DAS, a precoding matrix for the DAS (hereinafter, DAS precoding matrix) is required when performing signal transmission and reception between the base station and the user equipment.

The present invention relates to a method for transmitting and receiving a signal by sharing control information, which is used for selecting a DAS precoding matrix during a communication procedure between a base station belonging to the DAS and a user equipment, and by using a selected DAS precoding matrix. Hereinafter, the above-mentioned method for transmitting and receiving a signal will be described in detail with reference to FIG. 2.

Figure 2:
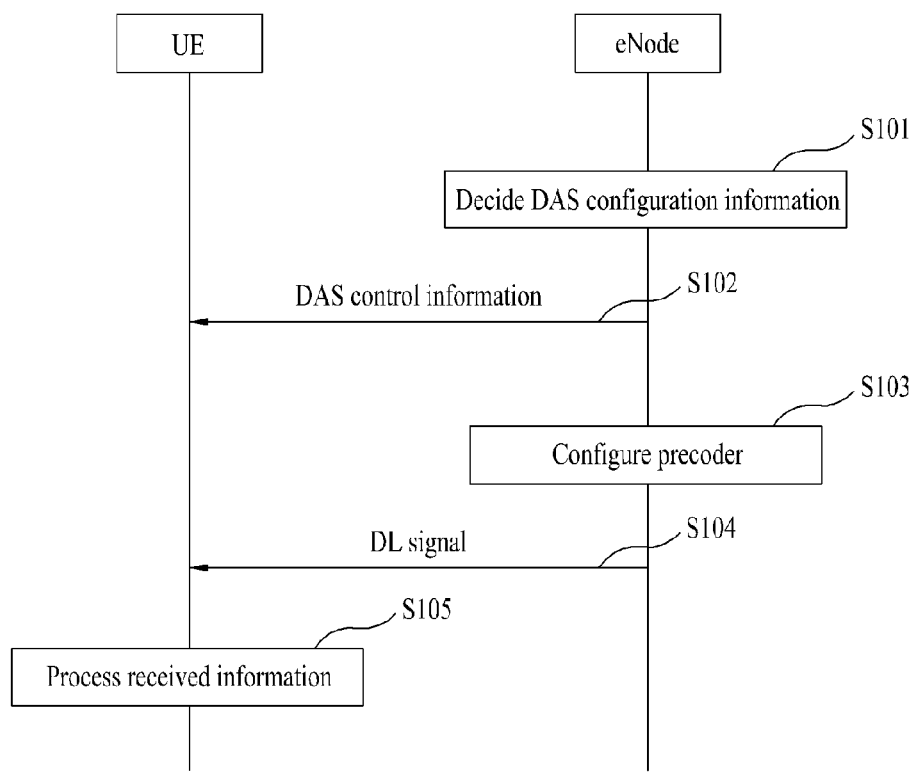
FIG. 2 illustrates an exemplary process of transmitting and receiving a signal to and from a base station and a user equipment in a distributed antenna system according to an exemplary embodiment of the present invention.

FIG. 2 illustrates an exemplary process of transmitting and receiving a signal to and from a base station and a user equipment in a distributed antenna system according to an exemplary embodiment of the present invention.

Referring to FIG. 2, prior to transmitting a signal to a user equipment, the base station belonging to the DAS decides DAS control information related to a DAS precoding matrix, which is used to perform communication with the user equipment, among all of the antennas included in the base station (S101). The DAS control information includes information on a precoding matrix, which is configured to select a base station antenna, in order to minimize an interference ratio occurring with other user equipments, when the base station performs communication with a specific user equipment, and to transmit a signal. More specifically, among all of the antennas included in the base station including multiple distributed antennas, the DAS control information may include antenna selection information respective to a specific number of antennas being used for a communication with the user equipment, and power control information respective to a power ratio being allocated to each of the selected antennas.

Unlike in the CAS, wherein an average path loss of all antennas is equal, in the DAS, due to a distribution of the antenna positions, a path loss between a specific user equipment and antenna is inconsistent. Accordingly, when using a precoding matrix having a consistent (or equal) power assignment ratio for each antenna is used, and when two or more user equipments exist near a single antenna, since a signal that is to be transmitted to a single user equipment may also be transmitted to another user equipment, the interference ratio may increase. Therefore, it is preferable that the power ratio being assigned each antenna is adjusted.

Meanwhile, the DAS control information may include a DAS precoding matrix index (PMI), which is selected by the base station according to an exemplary embodiment of the present invention.

Subsequently, the base station transmit the decided DAS control information to the user equipment, and the base station shares information for selecting a DAS precoding matrix, which is used when transmitting a signal from the base station to the user equipment (S102). Based upon the DAS control information, the base station selects a precoding matrix from a predefined codebook for the DAS (hereinafter, DAS codebook), so as to configure a precoder (S103). Then, the base station uses the selected precoding matrix so as to transmit a signal to the user equipment (S104). The DAS codebook may include an antenna selection type matrix corresponding to the antenna selection information and a power control type matrix corresponding to the power ratio information. A method for configuring the codebook for the DAS will hereinafter be briefly described with reference to FIG. 3 and FIG. 4.

Thereafter, the user equipment may use the received DAS control information, or the user equipment may use a precoded pilot (DRS/DM-RS), so as to process the received signal, by performing demodulation on the signal being hereinafter transmitted from the base station (S105).

Although it is not shown in FIG. 2, in step S101, the DAS control information may be semi-statically decided. For example, based upon a measurement result of an uplink signal being transmitted from the user equipment, or based upon an overall network situation, the base station may decide a specific antenna that is used for the communication with the user equipment, and the base station may also decide a power ratio being allocated to each antenna. In another example, the base station may decide based upon feedback information being transmitted from the user equipment, and the feedback information may include information on a specific antenna, which has been searched by the user equipment during a power off state or a mobility state, or information on a channel status, which has been drawn by measuring a downlink signal being transmitted from the base station.

Alternatively, since the DAS codebook, which will be described later on, is predefined in the base station and the user equipment, the user equipment may select an optimized precoding matrix from the DAS codebook based upon a channel intensity of the specific antenna or antenna group during a communication with the base station. Then, the user equipment may transmit the respective PMI information to the base station as feedback. In this case, the step of having the base station transmit DAS control information to the user equipment may be omitted.

Hereinafter, based upon the DAS control information according to the exemplary embodiment of the present invention, a method for configuring a precoding matrix and a DAS codebook will be described in detail with reference to FIG. 3 and FIG. 4.

Hereinafter, it will be assumed that multiple user equipments belonging to the DAS are aware of information related to the entire number of antennas ($N_{tx}$) of the base station through a broadcast channel, such as a PBCH of an LTE/LTE-A and an SFH of an IEEE 802.16. The precoding coefficients respective to each column and row configuring the precoding matrix corresponds to a specific antenna (port).

Figure 3:
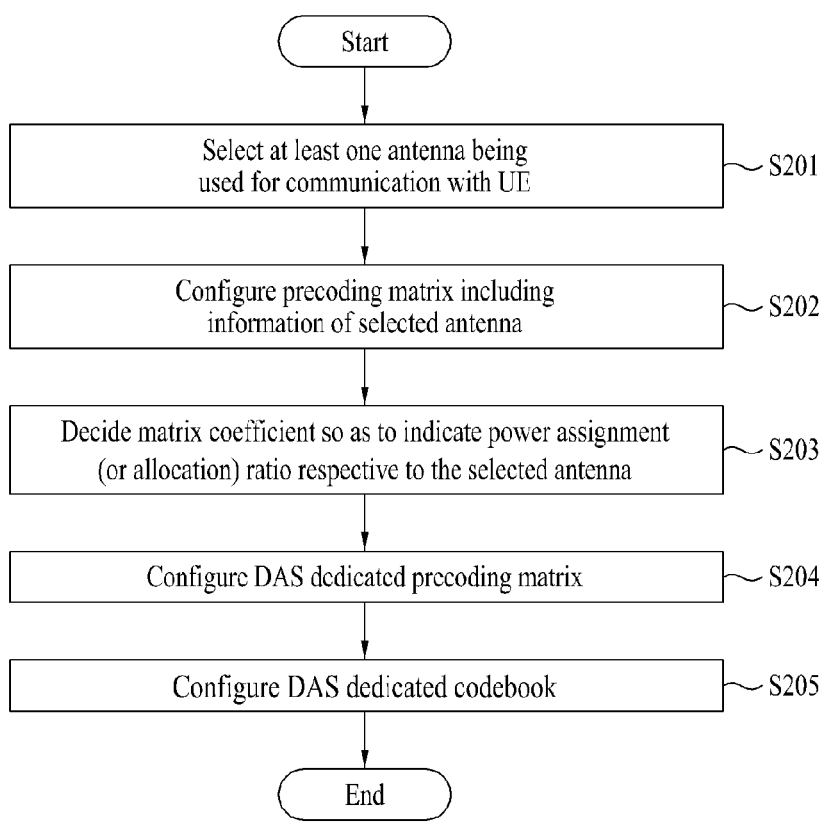
FIG. 3 illustrates a flow chart showing the process steps of an exemplary procedure for configuring a codebook for a DAS according to an exemplary embodiment of the present invention.

FIG. 3 illustrates a flow chart showing the process steps of an exemplary procedure for configuring a DAS codebook according to an exemplary embodiment of the present invention.

Referring to FIG. 3, among all of the antennas of the base station belonging to the DAS, when a specific number of antennas being used for the communication with a specific user equipment is selected (S201), a matrix of an antenna selection type corresponding to the information on the selected specific user equipment is configured (S202). In the matrix, by setting a specific column or specific row, which corresponds to a non-selected antenna or antenna group from among all of the antennas of the base station, as 0, the matrix including the antenna selection type information may be configured.

The DAS precoding matrix according to the exemplary embodiment of the present invention may be configured based upon the related art CAS precoding matrix. And, most particularly, the matrix of an antenna selection type of rank r may be designed based upon a precoding matrix, which is included in the conventional codebook for CAS (hereinafter, CAS codebook), wherein $N_{tx}=r$.

For example, when the entire number of antennas ($N_{tx}$) of the DAS base station is equal to 4, the precoding matrix of a rank 2 antenna selection type may be designed as shown in Equation 1.

$$\begin{bmatrix} x_{11} & x_{12} & 0 & 0 \\ x_{21} & x_{22} & 0 & 0 \end{bmatrix}^T \qquad \text{Equation 1}$$

In Equation 1, $$\begin{bmatrix} x_{11} & x_{12} \\ x_{21} & x_{22} \end{bmatrix}^T$$

corresponds to an arbitrary precoding matrix corresponding to rank 2, which is included in the related art CAS codebook, wherein $N_{tx}=2$. When applying this precoding matrix to UE 1 of FIG. 1, when UE 1 is capable of searching a total of 4 antennas, i.e., antennas 1, 2, 7, 8, in a case when the number of data streams that are transmitted to the UE 1 is equal to 2, and in case 2 antennas are being selected, a precoding matrix of a rank 2 antenna selection type, such as Equation 1, may be designed.

Subsequently, a power control type matrix corresponding to the information of the power ratio, which is being allocated to the antennas being selected in order to perform communication with a specific user equipment, is configured (S203). In the precoding matrix, the number of matrix elements may indicate the power ratio being assigned to each corresponding antenna.

For example, in case of UE 2 shown in FIG. 1, the base station may transmit the same signal to UE 2 through the distributed antennas 6, 7. At this point, in configuring a precoding matrix corresponding to $N_{tx}=r$ and rank 1, when the distance between antenna 6 and UE 2 is greater than the distance between antenna 7 and UE 2, instead of uniformly configuring the matrix coefficients such as $[0.5^{1/2}\ 0.5^{1/2}e^{j\theta}]^T$ (wherein, $\theta$ corresponds to an arbitrary phase), the power ratio may be non-uniformly decided such as $[0.8^{1/2}\ 0.2^{1/2}e^{j\theta}]^T$. The base station adjusts the power assignment ratio respective to antennas 6, 7, which are used to perform signal transmission to UE 2, to a coefficient ratio of a precoding vector, so as to enhance the performance of each antenna. The enhancement of the antenna performance may enhance the performance of a target user equipment, to which the base station intends to perform signal transmission, and may also enhance the performance of an overall system, which is based upon an interference occurring with other user equipments.

As described above, a DAS precoding matrix may be configured within respect to antenna selection information and power control information (S204), and a DAS codebook may be configured based upon the configured DAS precoding matrix (S205).

The DAS codebook, which is configured in accordance with an exemplary embodiment of the present invention, may be pre-stored in the base station and the user equipment. And, the base station or the user equipment may select a precoding matrix for a specific user equipment from the DAS codebook, based upon the overall network situation, from the stored codebook, so as to configure a precoder.

At this point, as described above, the base station may transmit DAS control information, which includes at least one of the antenna selection information and power control information, which are used for configuring the precoder, or PMI information respective to the selected precoding matrix to the user equipment.

Figure 4:
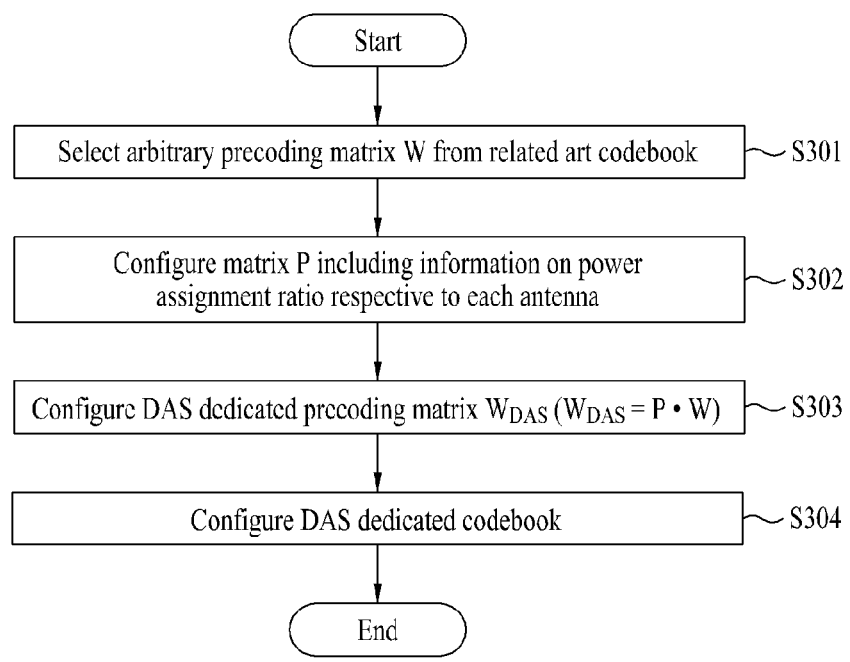
FIG. 4 illustrates a flow chart showing the process steps of another exemplary procedure for configuring a codebook for a DAS according to an exemplary embodiment of the present invention.

FIG. 4 illustrates a flow chart showing the process steps of another exemplary procedure for configuring a DAS codebook according to an exemplary embodiment of the present invention.

Referring to FIG. 4, a precoding matrix (W) is selected from a codebook used in the CAS, or from a codebook configured of a precoding matrix corresponding to the power control information, which assigns the same power to all base station antennas (S301). At this point, the precoding matrix (W) may be selected from a concatenated codebook or a nested codebook. Thereafter, a power control matrix (P), which includes information on power distribution ratio between the base station antennas according to the exemplary embodiment of the present invention, is configured (S302). As described above, the power control matrix (P) corresponds to a matrix including information for assigning a power ratio for each antenna in order to minimize an interference rate with other user equipment, in accordance with a distance between the user equipment and the respective antenna or a network status, and so on. The matrix P may be selected from a matrix set including at least one or more power control matrices. The selected arbitrary precoding matrix (W) and the power control matrix (P) may be converted to a precoding matrix ($W_{DAS}$) in the DAS through a predetermined calculation process, as shown below in Equation 2 (S303).

$$W_{DAS}=PW \qquad \text{Equation 2}$$

In Equation 2, the matrix W corresponds to a precoding matrix of a total number of antennas selected from a codebook ($N_{tx}$)×Rank r, wherein the codebook may corresponds to the CAS codebook or a concatenated codebook assigning the same power to all of the base station antennas. And, the matrix P corresponds to a diagonal matrix of $N_{tx} \times N_{tx}$, which includes information on the power distribution ratio between antennas for the DAS according to the exemplary embodiment of the present invention.

The matrix P for power control, which is decided in step S302, may correspond to a matrix of the antenna selection type, which includes information on some of the antennas that are being used from among the total antennas included in the base station. This is because, when the matrix coefficient indicating the power assignment ratio is set to 0, this indicates that the antenna respective to the corresponding row is not used during the communication. In this case, the power being assigned to each of the antennas of the base station may be controlled based upon the coefficients of the diagonal elements of the matrix P.

When the $n^{th}$ diagonal element of the matrix P is referred to as $p_n$, based upon the power control of the system, or based upon the power being assigned to each of the multiple user equipments located within the same cell, the value of $p_n$ may be limited as shown below in Equation 3.

$$\sum_{n=1}^{N_{tx}} |p_n|^2 \propto N_{tx} \qquad \text{Equation 3}$$

In the DAS, in case of using a concatenated codebook, which is configured in accordance with Equation 2, when configuring the precoder, the coefficients of the precoding matrix corresponding to the $n^{th}$ base station antenna may have the power scaled as much as $|p_n|^2$, based upon Equation 3. When the diagonal elements of the matrix P are referred to as power scaling factors, the power scaling factors of the unused antennas are set to 0 in order to indicate the antenna selection information that the user equipment intends to communicate by using only a specific base station antenna or antenna group. Similarly, in order to assign the antenna power, the power ratio may be controlled to a (power scaling factor)$^2$ ratio.

Thus, a DAS codebook including a precoding matrix ($W_{DAS}$) in a DAS, which is configured by performing the above-described procedure, may be designed (S304).

When the base station according to the exemplary embodiment of the present invention uses a DAS precoding matrix, which is configured as shown in FIG. 4, the power that may be allocated for each of the selected antennas may be limited. For example, when the base station transmits r number of data streams from the same frequency domain at the same time, and when the coefficients of the precoding matrices corresponding to the $k^{th}$ antenna unit are respectively set to $w_{k1}$, $w_{k2}$, . . . , $w_{kr}$, each coefficient may be included in the same precoding matrix or may be included in another precoding matrix corresponding to another user equipment.

When it is assumed that the average value of the transmission power respective to the system being transmitted to each stream is equally set to E, and when each of the precoding matrices is added at the same power ratio and transmitted, the average power ($P_k$) that is used during the transmission from the $k^{th}$ antenna unit may correspond to Equation 4.

$$P_k = \alpha_k E \sum_{i=1}^{r} |w_{ki}|^2 \qquad \text{Equation 4}$$

In Equation 4, $\alpha_k$ represents a coefficient being assigned for satisfying the self power limitations of the $k^{th}$ antenna unit.

In a CAS precoding matrix, to which the power limitations for each antenna are equally applied, the coefficients of the precoding matrices are identically set to $|w_{k1}|^2 = |w_{k2}|^2 = \ldots = |w_{kr}|^2 = 1/N_{tx}$, and the power being assigned to each antenna may also be equally assigned, such as $P_1 = P_2 = \ldots = P_k = P$. Therefore, the coefficient $\alpha_k$ may be equally set to $\alpha_k = (PN_{tx})/(Er)$ for all of the antennas included in the base station.

However, in the DAS, the power may be non-uniformly allocated to each of the distributed antenna within the cell. And, when a precoding matrix of the antenna selection type or the power control type is being used, the energy of the coefficients of the precoding matrices may also be diversely set from 0 to 1. And, accordingly, the coefficient $\alpha_k$ for each antenna unit may be diversely set to $k=1, \ldots, N_{tx}$. Since the coefficient may be transmitted to all of the user equipments, and, since the coefficient being applied to a codebook, which is used with respect to the corresponding user equipment, the coefficient may be individually transmitted as a control signal to each user equipment. Based upon the system configuration, by using a precoded pilot (DRS/DM-RS) without such separate signal, the user equipment may figure out the coefficient by itself.

The coefficient may be transmitted to all of the user equipments, or, since the coefficient being applied to the codebook, which is used with respect to the corresponding user equipment, the coefficient may be individually transmitted as a control signal to each user equipment. Based upon the system configuration, by using a precoded pilot (DRS/DM-RS) without such separate signal, the user equipment may figure out the coefficient by itself.

When configuring the precoding matrix for the DAS in accordance with the procedure shown in FIG. 4, the control information being transmitted to the user equipment from the base station may include index information of a precoding matrix (W) and index information of a power control matrix (P), which are selected from a CAS codebook.

At this point, based upon the fact that the variation cycle period of the matrix W used herein is different from that of the matrix P used herein, either the index of the matrix W and the index (or power scaling factors) of the matrix P may be notified to the user equipment by the base station, or the cycle period being reported from the user equipment may be configured differently.

When using the conventional concatenated codebook and power control matrix set in accordance with the procedure shown in FIG. 4, the size of the codebook is not required to be increased, so that the codebook can be capable of further including the precoding matrix for the DAS, in order to diversify the power assignment to the corresponding distributed antennas. In this case, the base station may separately transmit index information of the precoding matrix and the power control matrix, which are used by the base station to configure the precoder, to the user equipm'ent.

Alternatively, the user equipment may decide the power scaling factors or may select a matrix P from a power control matrix set, based upon the information measured from a downlink signal, such as the pilot being transmitted from the base station, so as to perform feedback transmission to the base station.

Meanwhile, unlike what is described above, a separate DAS codebook, which includes DAS precoding matrices being calculated by performing the procedure shown in FIG. 4, may be configured.

According to the above-described exemplary embodiments of the present invention, a DAS precoding matrix corresponding to at least one of the antenna selection information and the power control information is configured based upon a format of consistently setting up a sum power to 1, wherein the sum power is indicated by each column of a precoding matrix, which is included in the codebook regardless of the total number of base station antennas ($N_{tx}$) and rank number. In accordance with the method for defining a codebook, the sum power of each column within a precoding matrix may not be equal to 1, and the sum power of each column may be set up differently in accordance with the $N_{tx}$ value and the rank number. By scaling the precoding matrices, which are configured in accordance with the above-described exemplary embodiment of the present invention, to a specific value, diverse precoding matrices may be generated. Therefore, a codebook including the precoding matrices, which are configured in accordance with the exemplary embodiments of the present invention, may include all codebooks having the precoding matrices scaled to an arbitrary value.

The precoding matrices that are adequately generated for the DAS in accordance with the exemplary embodiments of the present invention may either be designed as a single codebook being included in the related art CAS codebook. Or, by dividing the codebook into a CAS codebook and a DAS codebook, a corresponding codebook may be used by determining whether the base station and the user equipment belong to the CAS or to the DAS. When dividing the codebook into the CAS codebook and the DAS codebook, indication information indicating whether the base station and the user equipment belong to the DAS or to the CAS, may be notified to multiple user equipments through a broadcast information, such as the PBCH in the LTE/LTE-A, the SFH in the IEEE 802.16, and so on. Alternatively, in case of when the user equipment moves, if an adequate codebook, such as a CAS codebook or a DAS codebook, is predetermined for each cell, when the user equipment is synchronized to a specific cell, a codebook most adequate for the specific cell may be downloaded and used.

Hereinafter, according to another exemplary embodiment of the present invention a user equipment and a base station (FBS, MBS) belonging to a DAS, in which the above-described exemplary embodiments of the present invention can be performed, will be described in detail.

The user equipment may operate as a transmitter in the uplink and may operate as a receiver in the downlink. Also, the base station may operate as a receiver in the uplink and may operate as a transmitter the downlink. More specifically, the user equipment and the base station may include a transmitter and a receiver so as to transmit information or data.

The transmitter and the receiver may include a processor, a module, a part and/or means for performing the embodiments of the present invention. Particularly, the transmitter and the receiver may include a module for encoding a message, a module for interpreting an encoded message, an antenna for transmitting and receiving messages, and so on. An example of such transmitting end and receiving end will be described in detail with reference to FIG. 5.

Figure 5:
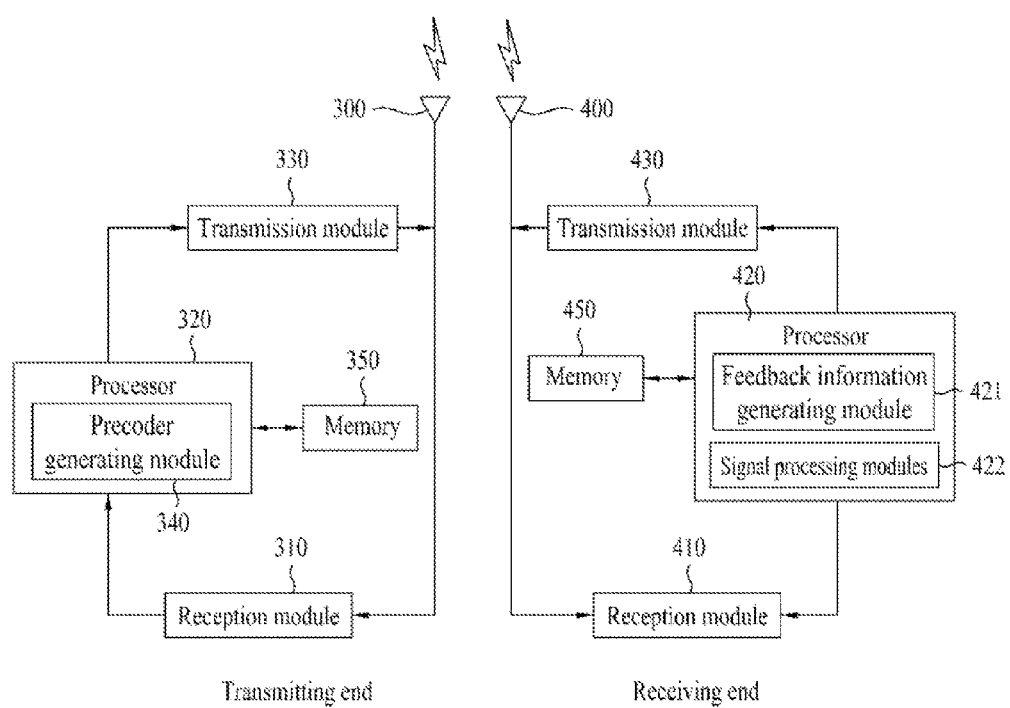
FIG. 5 illustrates a block view of a user equipment and a base station (FBS, MBS) that can perform the above-described exemplary embodiments of the present invention.

FIG. 5 illustrates a block view of a user equipment and a base station (FBS, MBS) that can perform the above-described exemplary embodiments of the present invention.

Referring to FIG. 5, the left side of the drawing shows the structure of a transmitting end, and the right side of the drawing shows the structure of a receiving end. And, in order to describe the above-described exemplary embodiments of the present invention, the transmitting end represents an exemplary base station belonging to the DAS, and the receiving end represents an exemplary user equipment, which is located within a cell being serviced by the base station. Each of the transmitting end and the receiving end may respectively include an antenna (300, 400), a reception module (310, 410), a processor (320, 420), a transmission module (330, 430), and a memory (350, 450). Each of the above-mentioned elements may perform its respective function. Hereinafter, each element will be described in more detail.

The antenna (300, 400) is configured of a receiving antenna, which performs the functions of receiving a radio signal from an external source and transporting the received radio signal to the reception module (310, 410), and a transmitting antenna, which performs the function of transmitting the signal generated from the transmission module (330, 430) to an external target. In case of the antenna (300, 400), when a multi-antenna (MIMO) function is supported, at least 2 or more antennas may be provided. And, in a DAS, when communication is performed between the transmitting end and the receiving end, among all of the base station antennas, one specific antenna or an antenna group may be used based upon the channel status, the position of the corresponding user equipment, the distance between the base station and the user equipment, and so on. Accordingly, among the multiple antennas being connected to the base station, wherein each antenna is spaced apart from one another at a predetermined distance, the antenna (300) of the transmitting end may correspond to one specific antenna or an antenna group. And, instead of being fixed, the selected antenna or antenna group may vary depending upon a change in the position of the receiving end.

The reception module (310, 410) may perform decoding and demodulation on the radio signal, which is received from the external source through the antenna, so as to recover the original data, which are then transported/transferred to the processor (320, 420). As shown in FIG. 5, the reception module and the antenna may be illustrated as a receiving unit configured to receive radio signals, without being separated from one another.

The processor (320, 420) generally controls the overall operations of the transmitting end or the receiving end. Most particularly, the processor may perform a controller function for performing the above-described embodiments of the present invention, a MAC (Medium Access Control) frame variable control function based upon service characteristics and frequency condition, a hand over function, and authentication and encoding functions.

The transmission module (350, 450) may perform predetermined coding and modulation processes on the data scheduled by the processor (320, 420) and to be transmitted to the outside, thereby delivering the processed data to the antenna. As shown in FIG. 4, the transmission module and the antenna may be illustrated as a transmitting unit configured to transmit radio signals, without being separated from one another.

A program for processing and controlling the processor (320, 420) may be stored in the memory (350, 450). The memory may also perform functions for temporarily storing input/output data (in case of a mobile station, uplink grant (UL Grant) assigned (or allocated) from the base station, system information, station identifier (STID), flow identifier (FID), Action Time, and so on). Furthermore, the memory may include at least one type of storage means, such as a flash memory type, a hard-disk type, a multimedia card micro type, a card-type memory (e.g., SD or XD memory, etc.), a Random Access Memory (RAM), a SRAM (Static Random Access Memory), a Read-Only Memory (ROM), an EEPROM (Electrically Erasable Programmable Read-Only Memory), a PROM (Programmable Read-Only Memory), a magnetic memory, a magnetic disk, and an optical disk.

A DAS codebook, which is configured in accordance with the exemplary embodiment of the present invention, may be stored in the memory (350, 450). The DAS codebook according to the present invention corresponds to a codebook, which is configured in accordance with the above-described exemplary embodiments of the present invention. Herein, the codebook may include an antenna selection matrix corresponding to information on a base station antenna, which is being selected based upon a specific position of a user equipment within the corresponding cell, and a power control matrix corresponding to power control information respective to an amount of power being assigned to each of the selected antennas.

Additionally, a related art CAS codebook or a codebook configured of a precoding matrix, which assigned the same power to all base station antennas, and a power control matrix set including information for controlling a power ratio being assigned to each antenna may also be stored in the memory (350, 450). Furthermore, the stored codebook may correspond to a DAS codebook, which is configured only of DAS precoding matrices, or may correspond to a codebook that may be collectively used in the DAS and the CAS, wherein the codebook include DAS precoding matrices and also precoding matrices that can be used in the related art CAS.

The processor (320) of the transmitting end may perform overall control operations of the base station, and may include a precoder generating module (340), which is configured in the base station to generate a precoder for satisfying optimal performance.

For example, the processor (320) may perform measurement of a channel status based upon an uplink signal, which is being transmitted through the transmitting module (330) of the receiving end. And, the processor (320) may select an optimized precoding matrix from the codebook, which is stored in the memory (350), based upon the result of the above-described process and information on the selected antenna (300), so as to configure the precoder. Alternatively, the processor (320) may perform measurement on an uplink signal, which is received through the reception module (310), so as to decide a matrix (P) indicating a power assignment ratio for each of antennas for the DAS (hereinafter, DAS antennas), thereby generating a DAS precoding matrix ($W_{DAS}$), by performing calculation operations with the related art precoding matrix (W). At this point, the matrix (P) indicating the power assignment ratio may either be decided by measuring an uplink signal, which is received from the user equipment through the reception module (310), or be decided by selecting a matrix from a control matrix set, which is stored in the memory (350).

Additionally, the processor (320) may generate DAS control information, which includes at least one of the antenna selection information and the power control information, which are used for selecting the precoding matrix, and may transmit the generated DAS control information to the receiving end. As described above in FIG. 2, the DAS control information may include index information of a DAS precoding matrix, which is selected by the transmitting end from the DAS codebook. When the processor (320) selects an arbitrary precoding matrix (W) from the CAS codebook, and when the DAS precoding matrix is configured by performing a calculation operation with the power control matrix (P), DAS control information including index information respective to the selected arbitrary precoding matrix (W) and including a power scaling factor or index information respective to a matrix (P) corresponding to the power assignment ratio may be transmitted to the receiving end through the transmission module (330).

Meanwhile, the precoder generating module (340) may not only configure a precoder based upon the result from measuring the received signal from the transmitting end, but may also configure a precoder by using feedback information being transmitted from the receiving end.

The processor (420) of the receiving end may perform the overall control operations of the user equipment, and may include a signal processing module (422), which is configured to process signals transmitted from the transmitting end, and a feedback information generating module (421), which is configured to generate feedback information that is to be transmitted to the transmitting end.

The signal processing module (422), selects a precoding matrix from the DAS codebook, which is stored in the memory (450), based upon the DAS control information, which is transmitted from the transmitting end through the reception module (410), so as to perform the signal processing procedure, such as demodulation, on the received signal.

When the processor (420) selects a matrix corresponding to antenna selection information, which is configured to select a specific antenna or antenna group having a strong channel intensity by measuring a downlink signal being transmitted from the transmitting end, the feedback information generating module (421), may generate feedback information, which includes the signal measurement result or PMI information respective to the selected precoding matrix. Based upon the measurement information obtained from the pilot, which is transmitted from the transmitting end, the feedback information may include index information on a power scaling factor or power control matrix.

Meanwhile, the base station may perform a controller function for performing the above-described embodiments of the present invention, an OFDMA (Orthogonal Frequency Division Multiple Access) packet scheduling, TDD (Time Division Duplex) packet scheduling, and channel multiplexing functions, MAC frame variable control function based upon service characteristics and frequency environment, a high-speed traffic real-time control function, a hand over function, authentication and encoding functions, packet modulation/demodulation functions for transmitting data, a high-speed channel coding function, and a real-time modem control function through at least one of the above-described modules, or the base station may further include a separate means, module, or part for performing such functions.

As described above, the detailed description of the disclosed preferred embodiments of the present invention is provided so that anyone skilled in the art can realize and carry out the present invention. In the above description, although the present invention is described with reference to the preferred embodiments of the present invention, it will be apparent to those skilled in the art that various modifications and variations can be made in the present invention without departing from the spirit or scope of the inventions.

Therefore, the present invention is not intended to limit the present invention to the embodiments presented herein. Instead, it is intended that the present invention grants a broadest range matching the principles and new characteristics disclosed herein.

Industrial Applicability

The above-described embodiments of the present invention may be applied to a base station and a user equipment, or another communication device of a wireless communication system.

What is claimed is:

1. A method for transmitting, by a base station including a plurality of antennas each being spaced apart from one another at a predetermined distance or more, a signal to a user equipment in a distributed antenna system (DAS), the method comprising:

transmitting, by the base station, antenna selection information indicating a Ntx×r precoding matrix W for indicating a specific number R of antennas used for a communication between the base station and the user equipment, among the plurality of antennas, where Ntx is a number of antennas included in the base station, R is an integer greater than 1 and r is a number of streams transmitted to the user equipment; and transmitting power ratio information indicating a Ntx×Ntx diagonal matrix P, the Ntx×Ntx diagonal matrix includes information on a ratio of the power being assigned to each of the R antennas used for the communication between the base station and the user equipment; and applying P*W to the signal, and transmitting the PW applied signal to the user equipment, wherein the Ntx×r precoding matrix W includes a R×r precoding matrix, which is one of a plurality of precoding matrixes used in a centralized antenna system (CAS), as a sub-matrix, wherein each of the plurality of precoding matrixes used in the CAS assigns a same power to each antenna of the R antennas, and wherein the Ntx×Ntx diagonal matrix P is configured to assign different powers to the R antennas.

2. The method of claim 1, wherein the antenna selection information and the power ratio information is semi-statically decided and transmitted through a dedicated control channel.

3. A base station for transmitting a signal to a user equipment in a distributed antenna system (DAS), the base station comprising:

a plurality of antennas each being spaced apart from one another at a predetermined distance or more; and a processor configured to:

control at least one of the plurality of antennas to transmit antenna selection information indicating a Ntx×r precoding matrix W for indicating a specific number R of antennas used for a communication between the base station and the user equipment, among the plurality of antennas, where Ntx is a number of antennas included in the base station, R is an integer greater than 1 and r is a number of streams transmitted to the user equipment, control at least one of the plurality of antennas to transmit power ratio information indicating a Ntx×Ntx diagonal matrix P, the Ntx×Ntx diagonal matrix includes information on a ratio of the power being assigned to each of the R antennas used for the communication between the base station and the user equipment, apply P*W, to the signal; and control the R antennas to transmit the P*W applied signal to the user equipment, wherein the Ntx×r precoding matrix W includes a R×r precoding matrix, which is one of a plurality of precoding matrixes used in a centralized antenna system (CAS), as a sub-matrix, wherein each of the plurality of precoding matrixes used in the CAS assigns a same power to each antenna of the R antennas, and wherein the Ntx×Ntx diagonal matrix P is configured to assign different powers to the R antennas.

4. The method of claim 1, wherein the antenna selection information and the power ratio information is transmitted with different periodicities from each other.

5. The method of claim 1, wherein the Ntx×Ntx diagonal matrix P includes zero at diagonal elements which are corresponding to the other antennas of the plurality of antennas than the R antennas.

6. The method of claim 1, wherein the Ntx×r precoding matrix W includes the R×r precoding matrix at columns which are corresponding to the R antennas used for the communication between the base station and the user equipment and zeros at columns which are corresponding to other antennas of the plurality of antennas than the R antennas.

7. The base station of claim 3, wherein the antenna selection information and the power ratio information is transmitted with different periodicities from each other.

8. The base station of claim 3, wherein the Ntx×Ntx diagonal matrix P include zero at diagonal elements which are corresponding to the other antennas of the plurality of antennas than the R antennas.

9. The base station of claim 3, wherein the Ntx×r precoding matrix W includes the R×r precoding matrix at columns which are corresponding to the R antennas used for the communication between the base station and the user equipment and zeros at columns which are corresponding to other antennas of the plurality of antennas than the R antennas.

\* \* \* \* \*